United States Patent
Ha et al.

(10) Patent No.: US 10,984,965 B2
(45) Date of Patent: Apr. 20, 2021

(54) FULLY BIODEGRADABLE SUPERCAPACITOR AND METHOD FOR MANUFACTURING SAME

(71) Applicant: KOREA UNIVERSITY RESEARCH AND BUSINESS FOUNDATION, Seoul (KR)

(72) Inventors: Jeong Sook Ha, Seoul (KR); Geumbee Lee, Uijeongbu-si (KR); Yu Ra Jeong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 36 days.

(21) Appl. No.: 16/476,572

(22) PCT Filed: Dec. 20, 2017

(86) PCT No.: PCT/KR2017/015133
§ 371 (c)(1),
(2) Date: Jul. 9, 2019

(87) PCT Pub. No.: WO2018/131820
PCT Pub. Date: Jul. 19, 2018

(65) Prior Publication Data
US 2020/0168407 A1    May 28, 2020

(30) Foreign Application Priority Data
Jan. 11, 2017  (KR) .................. 10-2017-0004311

(51) Int. Cl.
*H01G 11/46*  (2013.01)
*H01G 11/56*  (2013.01)
*H01G 11/84*  (2013.01)
*C08L 5/12*  (2006.01)
(Continued)

(52) U.S. Cl.
CPC ............. *H01G 11/46* (2013.01); *C08L 5/12* (2013.01); *C08L 29/04* (2013.01); *C08L 101/16* (2013.01); *H01G 11/56* (2013.01); *H01G 11/84* (2013.01)

(58) Field of Classification Search
CPC ........ H01G 11/46; H01G 11/56; H01G 11/84; H01G 11/78; H01G 11/54
See application file for complete search history.

(56) References Cited

U.S. PATENT DOCUMENTS 10,655,024 B2 *  5/2020  Yadavalli ............. G03F 7/32
2016/0050750 A1 *  2/2016  Rogers ................. H05K 3/285
                                                    361/767

FOREIGN PATENT DOCUMENTS

CN       106486287 A  *  3/2017  ............. H01G 4/14
KR  10-2010-0100482 A     9/2010
(Continued)

OTHER PUBLICATIONS

Lee, Geumbee et al., Fully Biodegradable Microsupercapacitor for Power Storage in Transient Electronics, May 23, 2017, Advanced Energy Materials, 1700157, 12 pages (Year: 2017).*

(Continued)

*Primary Examiner* — Nathan Milakovich
(74) *Attorney, Agent, or Firm* — NSIP Law (57) ABSTRACT

The present description relates to a fully biodegradable supercapacitor and a method for manufacturing the same. When the fully biodegradable supercapacitor and the method for manufacturing the same according to the present description are used, supercapacitor having high capacitance, high energy, and high output is provided by forming a metal oxide on a metal electrode and a surface of a solid electrolyte. In addition, the present description is environment-friendly, biodegradable, and biocompatible to be (Continued)

US 10,984,965 B2
Page 2 implanted into a body, and may be a bio-implantable energy storage device in the future.

8 Claims, 6 Drawing Sheets

(51) Int. Cl.
*C08L 29/04* (2006.01)
*C08L 101/16* (2006.01)

(56) References Cited

FOREIGN PATENT DOCUMENTS

| KR | 10-2010-0128102 A | 12/2010 |
| KR | 10-2010-0132369 A | 12/2010 |
| KR | 10-2015-0027458 A | 3/2015 |

OTHER PUBLICATIONS

Moon, Won Gyun et al., A Biodegradable Gel Electrolyte for Use in High-Performance Flexible Supercapacitors, ACS Appl. Mater. Interfaces, Jan. 26, 2015, 3503-3511 (2015) (Year: 2015).*
Lee, Geum Bi et al., "Fabrication of Fully Biodegradeable Micro-supercapacitors", Theories and Applications of Chemical Eng., vol. 22, No. 2, 2016, (1 page in English and 2 pages in Korean), Abstract only.
International Search Report dated May 3, 2018 in counterpart International Patent Application No. PCT/KR2017/015133 (2 pages in English and 2 pages in Korean).

* cited by examiner

FULLY BIODEGRADABLE SUPERCAPACITOR AND METHOD FOR MANUFACTURING SAME

CROSS REFERENCE TO RELATED APPLICATIONS

This application is a U.S. National Stage Application of International Application No. PCT/KR2017/015133, filed on Dec. 20, 2017, which claims the benefit under 35 USC 119(a) and 365(b) of Korean Patent Application No. 10-2017-0004311, filed on Jan. 11, 2017, in the Korean Intellectual Property Office, the entire disclosure of which is incorporated herein by reference for all purposes.

TECHNICAL FIELD

The present description relates to a fully biodegradable supercapacitor and a method for manufacturing the same. The present description also relates to an environment-friendly fully biodegradable by manufacturing a supercapacitor using a biodegradable metal and a polymer, and a manufacturing method thereof.

BACKGROUND ART

The demand for an energy storage device and the generation thereof for stably and continuously supplying energy to an electronic device has promoted the development of a battery and a supercapacitor. However, materials such as lithium may cause environmental pollution problems and also cause harmful effects on the human body. Therefore, studies on transient electronics which incorporate emerging technologies for losing the function of a device in water or a biological solution are being conducted actively, and the trend has also affected an energy storage device. Recently, several studies have been conducted on environment-friendly batteries that incorporate such technologies. Such batteries are soluble and consist of materials harmless to the human body, but have a low driving voltage per battery, and the dissolution rates of the components are rapid which is within a few seconds. In particular, their three-dimensional structure not only makes integration with other devices difficult, but also hinders practical application because it interferes with body insertion. In particular, researches on such transient energy storage devices have been limited to batteries. A supercapacitor is referred to as a next generation energy storage device and has a rapid charge and discharge rate, high output, excellent long-term lifespan characteristics, safety of a material, and the like compared to a battery. Recently, in an effort to improve the performance of a supercapacitor, a metal oxide is coated on an electrode material in the form of nanoparticles, nanorods, or films. In addition to storing electric energy, such a supercapacitor also performs various roles in an electronic circuit together with other electrical components as a passive component. However, the description of a biodegradable supercapacitor made of a safe material is essential in order to perform a role as being applied to a transient system.

SUMMARY OF INVENTION

Technical Problem

The present description provides a biodegradable supercapacitor.
The present description also provides a method for manufacturing a biodegradable supercapacitor.

Solution to Problem

The supercapacitor according to the present description includes: a flexible substrate including a biodegradable polymer, an electrode layer including a biodegradable metal formed on the substrate, and a biodegradable solid electrolyte layer formed on the metal electrode layer, and a metal oxide layer is formed between the metal electrode layer and the solid electrolyte layer.

The biodegradable metal may include one or more selected from a group consists of tungsten, iron, magnesium, zinc, molybdenum and the like.

The metal oxide may be formed as the biodegradable metal of the electrode layer is electrochemically corroded.

The biodegradable polymer may include one or more selected from a group consists of: polylactic acid-glycolic acid copolymer, bio cellulose, polyglycolic acid, polylactic acid, poly-ε-caprolactone, polyamino acid, polyanhydride, polyorthoester, and their derivatives and copolymer.

The biodegradable solid electrolyte layer may include more than one selected from a group consists of an agarose, polyvinyl alcohol and polyethylene oxide.

The supercapacitor may further include a biodegradable encapsulant covering the substrate, the electrode layer, and the solid electrolyte layer.

The method for manufacturing a supercapacitor may include: manufacturing a metal electrode layer, forming the metal electrode layer on a flexible substrate including a biodegradable polymer, manufacturing a structure by forming a biodegradable solid electrolyte layer on the metal electrode layer, and applying electricity to the structure so that a metal oxide layer is formed between the metal electrode layer and the solid electrolyte layer.

Manufacturing a structure by forming a biodegradable solid electrolyte layer on the metal electrode layer may further include: forming a mixture for forming a biodegradable solid electrolyte by mixing sodium chloride with one or more selected from a group consisting of agarose, polyvinyl alcohol and polyethylene oxide, and stacking the mixture on the metal electrode layer.

Effects Of Invention

The supercapacitor and the manufacturing method thereof according to the present description may provide a supercapacitor having high capacitance, high energy, and high output, as a metal oxide layer is formed between a metal electrode layer and a solid electrolyte layer.

In addition, the present disclosure may be environment-friendly, biodegradable, biocompatible, and implantable, and may implement a bio-implantable energy storage device in the future.

METHOD FOR CARRYING OUT THE INVENTION

Unless defined otherwise, all terms used herein, including technical or scientific terms, have the same meaning as commonly understood by one of ordinary skill in the art to which this invention belongs.

The present specification discloses a preferred method or sample, but the same or equivalent are included in the scope of the present description. The contents of all publications, which are incorporated herein by reference, are introduced into the present description.

According to the present specification, unless the context requires otherwise, the terms "include" and "including" refer to the stated operations or components, or a group of operations or components, but it is to be understood that other operations or components, or a group of operations or components are not excluded.

Hereinafter, examples will be described in detail.

Figure 1:
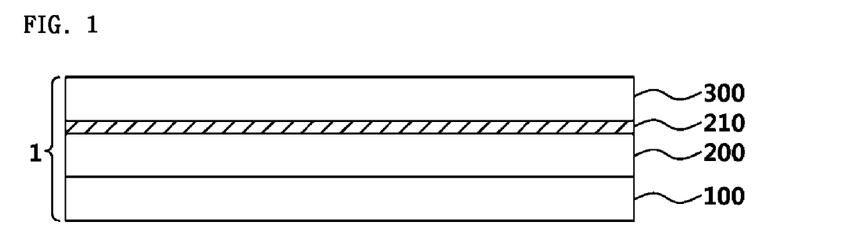
FIG. 1 is a cross-sectional view of a supercapacitor according to the manufacturing method of the present description.

The present description provides a supercapacitor 1 including: a flexible substrate 100 including a biodegradable polymer, an electrode layer 200 including a biodegradable metal formed on the substrate 100, and a biodegradable solid electrolyte layer 300 formed on the metal electrode layer 200, wherein a metal oxide layer 210 is formed between the metal electrode layer 200 and the solid electrolyte layer 300.

The biodegradable metal may include one or more selected from a group consisting of tungsten, iron, magnesium, zinc, and molybdenum. Tungsten may be preferred but not limited thereto.

The metal oxide may be formed as the biodegradable metal of the electrode layer 200 is electrochemically corroded.

Since the solid electrolyte layer 300 contains moisture, the metal oxide layer 210 may be formed between the metal electrode layer 200 and the solid electrolyte layer 300.

The metal oxide layer 210 is formed without an artificial synthesis and deposition process, thereby simplifying a manufacturing process.

In addition, the capacitance of the supercapacitor 1 may be improved as the metal oxide layer 210 is formed.

When a metal oxide layer 210 is formed between the metal electrode layer 200 and the solid electrolyte layer 300, a larger capacitance may be obtained since the metal oxide layer 210 directly generates electrons by redox reaction with the solid electrolyte layer 300.

According to an example of the present description, a supercapacitor may implement a capacitance per high volume of 54 F/cm3, an energy density per volume of 4.8 mWh/cm3 and an power density per volume of 34 W/cm3.

The substrate 100 includes a biodegradable polymer, and the biodegradable may include one or more selected from a group consisting polylactic acid-glycolic acid copolymer, bio cellulose, polyglycolic acid, polylactic acid, poly-ϵ-caprolactone, polyamino acid, polyanhydride, polyorthoester, and their derivatives and copolymer. The polylactic acid-glycolic acid copolymer is preferred but not limited thereto.

The flexible substrate 100 including the biodegradable polymer is described in the following manufacturing method.

The biodegradable solid electrolyte layer 300 may include one or more selected from a group consisting of agarose, polyvinyl alcohol and polyethylene oxide. Agarose is preferred but not limited thereto.

The supercapacitor 1 according to the present description may further include a biodegradable encapsulant (not shown) for covering the substrate, the electrode layer and the structure of the solid electrolyte layer, and may control the biodegradation time according to the type and the thickness of the biodegradable encapsulant. If the biodegradable encapsulant can be biodegraded, the type and the thickness thereof are not limited.

In addition, the biodegradable encapsulant may protect the supercapacitor 1 from external impact, dust, and moisture.

The biodegradable encapsulant may be the same as the biodegradable polymer included in the substrate 100. A natural biodegradable polymer may include one or more selected from a group consists of modified polysaccharides, oxidized cellulose, gelatin, collagen, and the like.

Each operation of the method of manufacturing the supercapacitor according to the present description is described in detail below.

Figure 7:
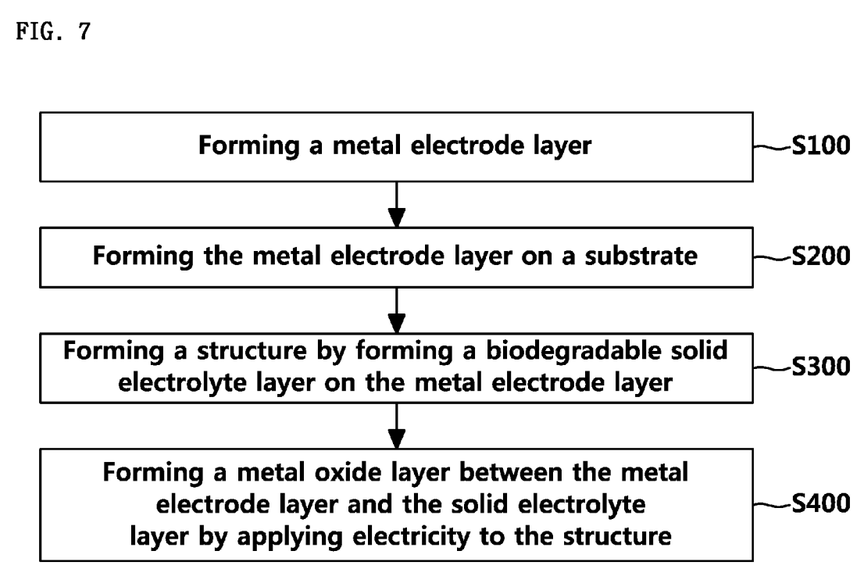
FIG. 7 is a flowchart showing a method for manufacturing a supercapacitor according to the present description.

A method of manufacturing a supercapacitor 1 according to the present description may include: an operation S100 of manufacturing a metal electrode layer 200, an operation S200 of forming the metal electrode layer 200 on a flexible substrate 100 including a biodegradable polymer, an operation S300 of forming a biodegradable solid electrolyte layer 300 on the metal electrode layer 200 to form a structure, and an operation S400 of applying electricity to the structure so that a metal oxide layer 210 is formed between the metal electrode layer 200 and the solid electrolyte layer 300.

Firstly, an operation S100 of manufacturing a metal electrode layer 200.

The operation S100 of manufacturing the metal electrode layer 200 may further include: coating a polymer film on a wafer, depositing a metal on the polymer film, and depositing a polymer film once again on the metal electrode layer 200.

The metal electrode layer 200 may be formed by directly depositing the metal on a wafer. However, the reason for coating the polymer film before depositing the metal on the wafer is because in the case a metal is directly deposited on the wafer to form a metal electrode layer 200, the metal electrode 200 may be torn or distorted during the subsequent operation S200 of forming the metal electrode layer 200 on a flexible substrate 100 including the biodegradable polymer by isolating the metal electrode layer 200 from the wafer. Accordingly, the metal electrode layer 200 may be wrapped with a polymer film to reduce the above problems.

The polymer film may use a polyamide-based polymer. If a polymer can protect the metal electrode layer 200 and easily removable, the kind of a polymer is not limited.

In addition, the operation of coating a polymer binder may be further included before the operation of coating a polymer film on the wafer. The polymer binder may be polymethyl methacrylate but if a polymer binder can be easily removable by an organic solvent, the kind of a polymer binder is not limited.

Further, the organic solvent may be acetone but if an organic solvent can remove the polymer binder easily, the kind of an organic solvent is not limited.

The present description may further include forming a biodegradable metal electrode layer 200 by etching a polymer film surrounding a metal electrode layer 200.

Forming a biodegradable metal electrode layer 200 by etching a polymer film surrounding the metal electrode layer 200, may be selectively etched by reactive ion etching RIE and may be performed in an oxygen atmosphere.

The reactive ion etching may be performed in a vacuum reactor at a radio frequency power of 200-400 w, a pressure of 0.1 mbar, and a gas flow of 100-200 sccm O2, and the above range may be preferred.

In the operation of manufacturing a biodegradable metal electrode layer 200 by etching the polymer film surrounding the metal electrode layer 200, the polymer film surrounding the metal electrode layer 200, may have a channel spacing of 150 μm or less in order to effectively diffuse ions, and may be etched in the shape of clasped hands, but it is not limited thereto.

The operation S100 of manufacturing a metal electrode layer 200 of the present description may further include isolating the metal electrode layer 200 from the wafer.

In the operation of isolating the metal electrode layer 200 from the wafer, the metal electrode layer 200 and the wafer may be isolated by a polydimethylsiloxane coating, but not limited thereto.

Next, the metal electrode layer 200 is formed S200 on a flexible substrate 100 including a biodegradable polymer.

Forming the metal electrode layer 200 on a flexible substrate 100 including a biodegradable polymer may further include manufacturing a flexible substrate 100 including a biodegradable polymer.

The flexible substrate 100 including the biodegradable polymer may be formed by mixing a biodegradable polymer with acetyl acetate, applying the biodegradable polymer to a substrate and then drying the polymer for 12 to 24 hours. The substrate may be a wafer, and not limited thereto.

The biodegradable polymer may include one or more selected from a group consisting of polylactic acid-glycolic acid copolymer, bio-cellulose, polyglycolic acid, polylactic acid, poly-ε-caprolactone, polyamino acid, polyanhydride, polyorthos ester, and their derivatives and copolymer, and a polylactic acid-glycolic acid copolymer may be preferred.

In the operation S300, a structure is formed by forming a biodegradable solid electrolyte layer 300 on the metal electrode layer 200.

Manufacturing S300 a structure by forming a biodegradable solid electrolyte layer 300 on the metal electrode layer 200 may further include: manufacturing a mixture for forming a biodegradable solid electrolyte by mixing sodium chloride with one or more selected from a group consisting of agarose, polyvinyl alcohol and polyethylene oxide, and forming a biodegradable solid electrolyte layer 300 on the metal electrode layer 200.

As an example of the operation, the mixture for forming the biodegradable solid electrolyte is formed by forming a mixed solution by mixing 1 to 5 g of sodium chloride and 80 to 100 mL of deionized water, adding 1 to 3 g of agarose to the mixture, and stirring at 150° C. or 10 to 20 minutes.

The structure may be formed by forming a biodegradable solid electrolyte layer 300 on the metal electrode layer 200, and by solidifying the mixture for forming a biodegradable solid electrolyte after applying to an organic substrate.

In the operation S400, electricity is applied to the structure so that a metal oxide layer 210 is formed between the metal electrode layer 200 and the solid electrolyte layer 300.

A metal oxide layer 210 may be formed on the metal electrode layer 200 between the solid electrolyte layer 300 by applying electricity to the structure.

In the present description, a supercapacitor 1 of high capacitance, high energy and high output may be formed as the metal oxide layer 300 is formed.

EXAMPLE

Example 1

Firstly, a wafer is coated with polymethylene methacrylate PMMA.

Coated wafers are coated once again with polyamide D-PI, and an electrode in the shape of clasped hands which are spaced 150 μm apart is patterned by photolithography method.

Next, iron which is a biodegradable metal is coated using electron beam evaporation and D-PI is coated once again.

Next, PMMA and D-PI are etched using reactive ion etching and immersed in acetone for 24 hours to remove PMMA.

Next, the wafer and the metal electrode layer are isolated by using polydimethylsiloxane, and D-PI is removed.

Polydimethylsiloxane and D-PI are removed once again after the iron electrode layer is transferred to a biodegradable substrate.

Manufacturing a supercapacitor is completed by applying electricity after forming a structure by forming a biodegradable solid electrolyte on the iron electrode layer.

The biodegradable substrate is prepared by adding 2.5 g of polylactic acid-glycolic acid copolymer into 50 mL of acetyl acetate, stirring at room temperature until it is dissolved, coating the transparent solution on a silicon wafer and then drying for 24 hours.

The biodegradable solid electrolyte is a gel-type biodegradable solid electrolyte and is prepared by mixing 2.13 g of sodium chloride in 100 mL of deionized water at 30° C., adding 1 g of agarose, stirring at 150° C. for 20 minutes, applying to a glass substrate, and drying for 24 hours.

Example 2

A supercapacitor according to the manufacturing method in the same manner as Example 1, except that molybdenum is used instead of iron which is a biodegradable metal.

Example 3

A supercapacitor according to the manufacturing method in the same manner as Example 1, except that tungsten is used instead of iron which is a biodegradable metal.

Example 4

A supercapacitor according to the manufacturing method in the same manner as Example 1, except that gold is used instead of iron which is a biodegradable metal.

Figure 2A:
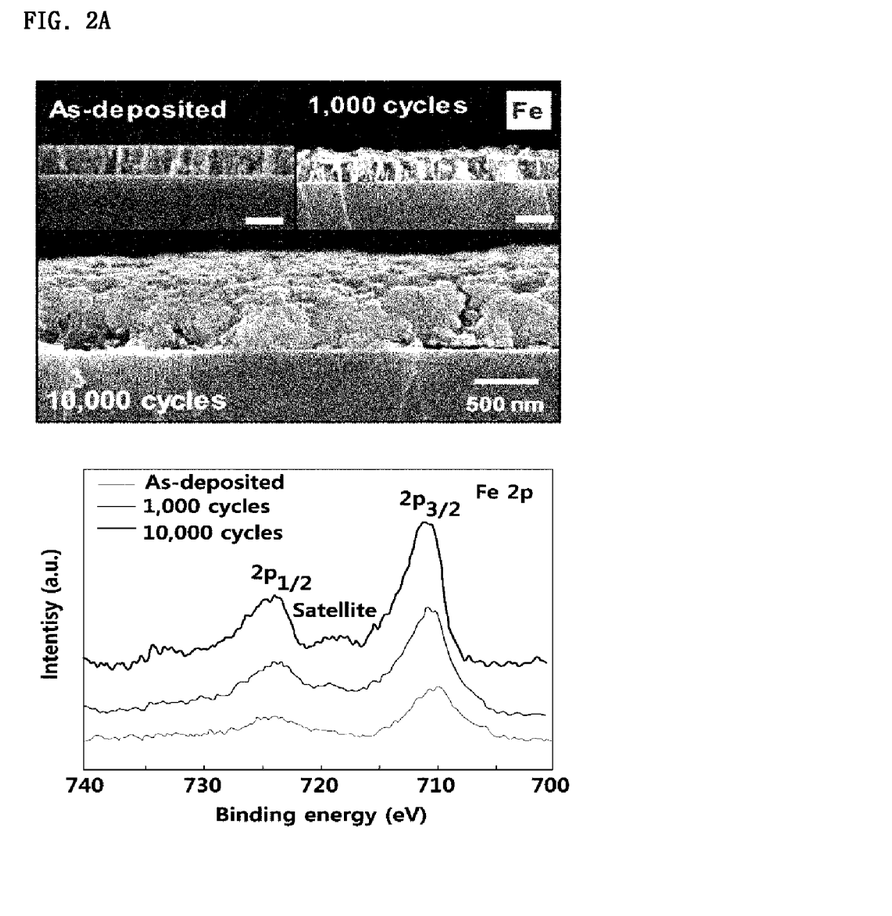
FIG. 2A is an XPS measurement result for a biodegradable metal oxide formed according to example 1.
Figure 2B:
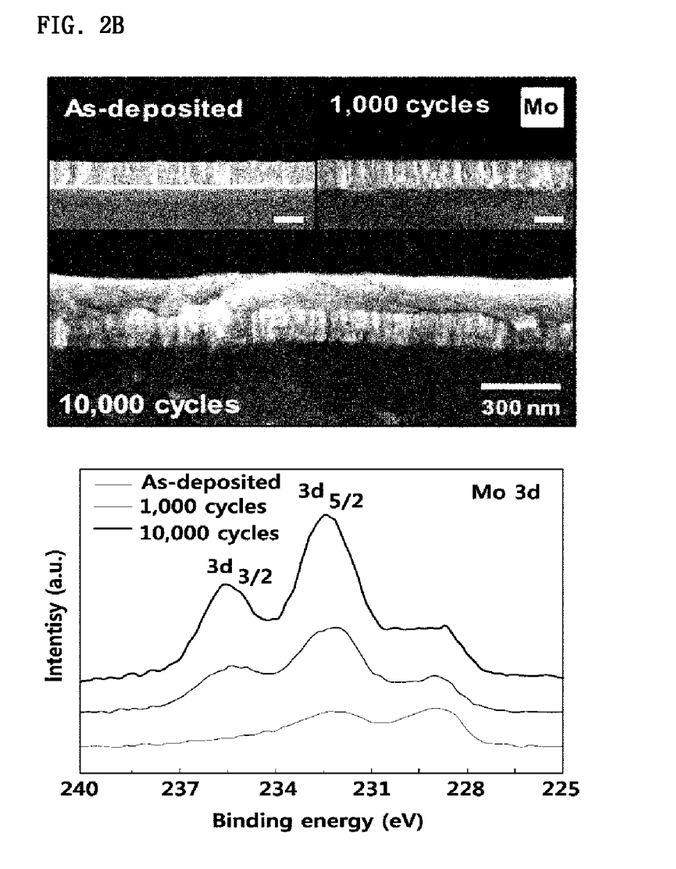
FIG. 2B is an XPS measurement result for a biodegradable metal oxide formed according to example 2.
Figure 2C:
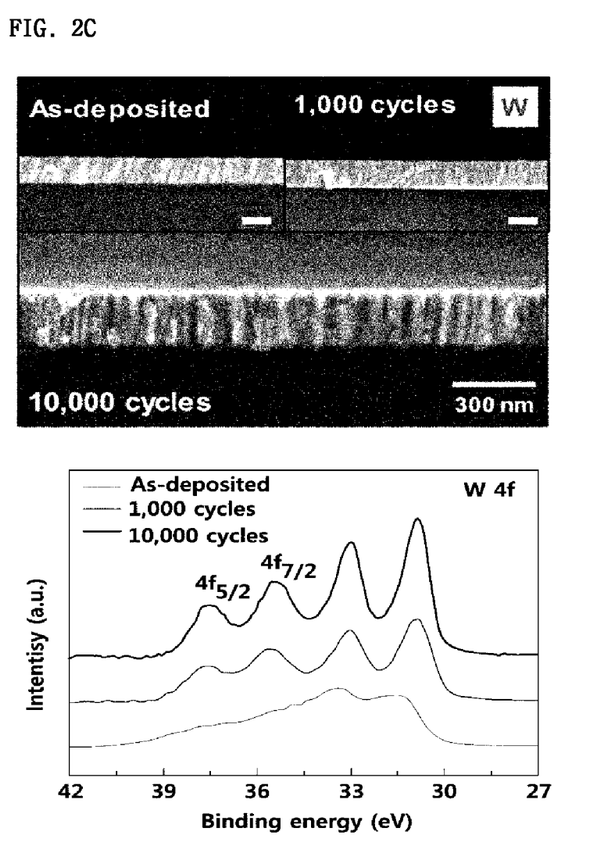
FIG. 2C is an XPS measurement result for a biodegradable metal oxide formed according to example 3.

FIGS. 2A to 2C are XPS measurement results of the electrodes of the biodegradable supercapacitors manufactured according to the examples 1 to 3. As shown in FIGS.

2A to 2C, the metal oxide layer 210 is formed between the electrode layer 200 and the solid electrolyte layer 300.

Characteristics Rating

Figure 3:
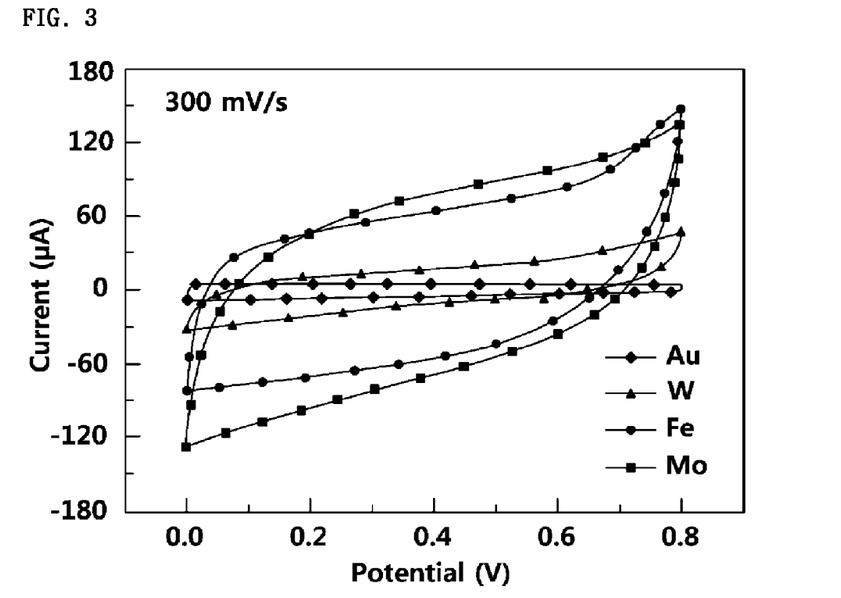
FIG. 3 is a graph of cyclic voltammogram according to the type of an electrode at a scan speed of 0.3 V/s of a supercapacitor according to the manufacturing method of the examples 1 to 4.

FIG. 3 is cyclic voltammogram graph of supercapacitors according to the manufacturing method of the Examples 1 to 4 according to the type of electrode at a scan rate of 0.3 V/s. As shown in FIG. 3, the supercapacitors according to the manufacturing method of the Examples 1 to 4 have a CV curve in a rectangular shape in the potential range of 0 to 0.8 V, showing the characteristics of an ideal supercapacitor.

Figure 4:
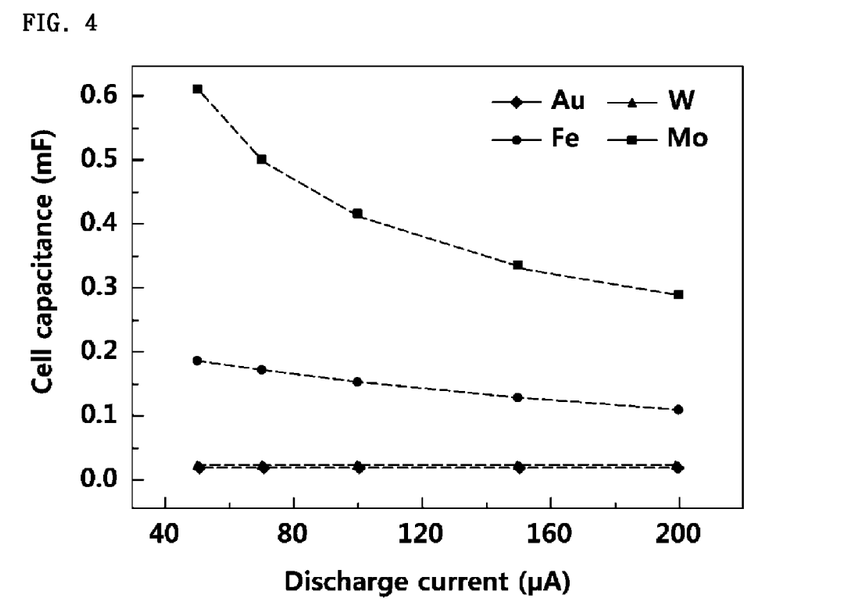
FIG. 4 is a graph showing capacitance per volume of a supercapacitor according to the manufacturing method of the examples 1 to 4.

FIG. 4 is a graph showing the capacitance per volume of the supercapacitors according to the manufacturing method of the Examples 1 to 4. As shown in FIG. 4, the supercapacitors according to the manufacturing method of the Examples 1 to 4 have a high capacitance per volume.

Figure 5:
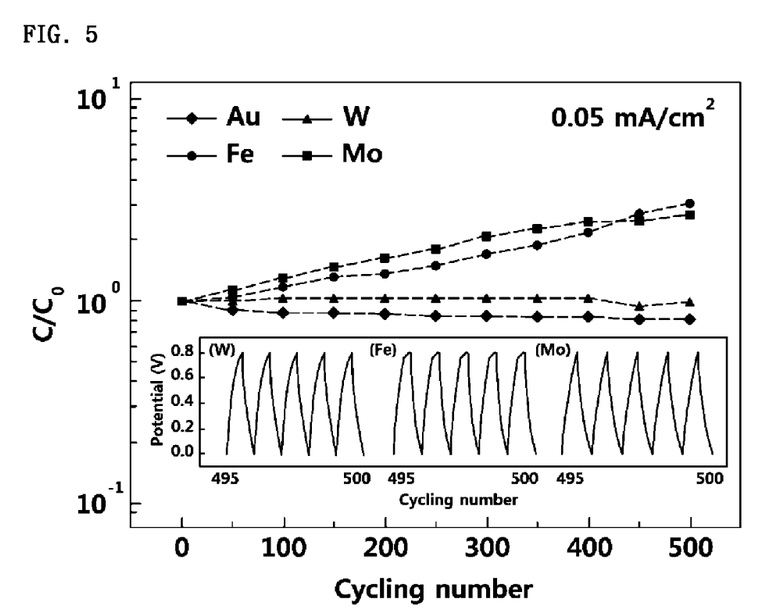
FIG. 5 is a graph showing cycling characteristics of an electrode of a supercapacitor according to the manufacturing method of the examples 1 to 4.

FIG. 5 is a graph showing a capacitance change according to cycles of the supercapacitors according to the manufacturing method of the Examples 1 to 4. As shown in FIG. 5, capacitance is increased as the cycle progressed in the supercapacitors according to the manufacturing method of the Examples 1 to 4. As the cycles progress, a metal oxide layer is formed between the electrode and the electrolyte so that the capacitance is increased greatly compared to the initial capacitance.

Figure 6:
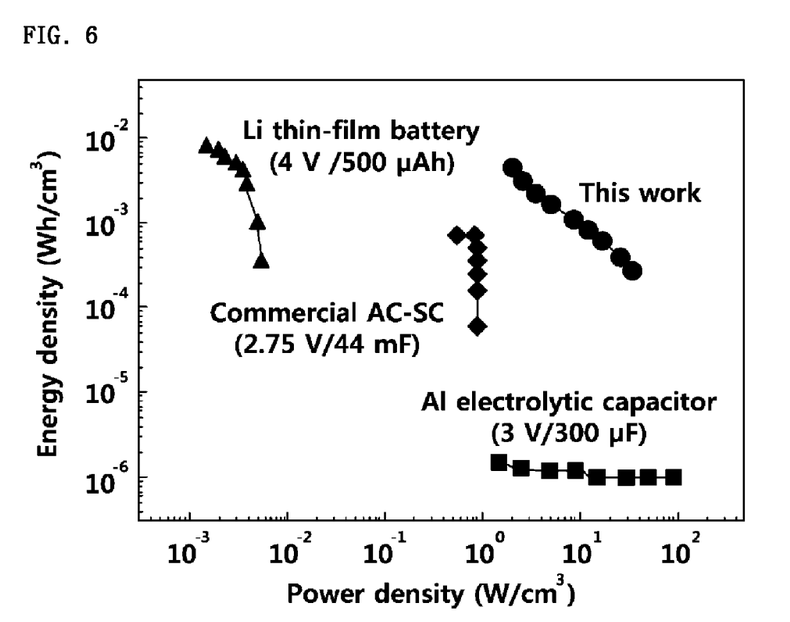
FIG. 6 is a Ragon plot showing the relationship between energy density and power density per unit volume for a biodegradable supercapacitor according to the present description and a variety of existing energy storage devices.

FIG. 6 is a Ragon plot showing per unit volume the relationship between the energy density and the power density of the supercapacitors according to the present description and the existing energy storage devices. As shown in FIG. 6, the supercapacitors according to the present description have a high voltage range, and thus the energy density is improved.

While the present disclosure has been shown and described in connection with the exemplary embodiments, it is clearly understood that the same is by way of illustration and example only and is not to be construed as limiting the present invention. It is to be understood, however, that the invention is not to be limited to the specific embodiments, but includes all modifications, equivalents, and alternatives falling within the spirit and scope of the disclosure.

DESCRIPTION OF SYMBOLS

1: supercapacitor 100: substrate
200: metal electrode layer 210: metal oxide layer
300: electrolyte layer

What is claimed is:

1. A supercapacitor comprising:
    a flexible substrate comprising a biodegradable polymer;
    a metal electrode layer comprising a biodegradable metal disposed on the flexible substrate; and
    a biodegradable solid electrolyte layer disposed on the metal electrode layer,
    wherein a metal oxide layer is disposed between the metal electrode layer and the biodegradable solid electrolyte layer.

2. The supercapacitor of claim 1, wherein the biodegradable metal comprises one or more selected from the group consisting of tungsten, iron, magnesium, zinc, and molybdenum.

3. The supercapacitor of claim 1, wherein the metal oxide layer is disposed as the biodegradable metal of the metal electrode layer is electrochemically corroded.

4. The supercapacitor of claim 1, wherein the biodegradable polymer comprises one or more selected from the group consisting of polylactic acid-glycolic acid copolymer, biocellulose, polyglycolic acid, polylactic acid, poly-ϵ-caprolactone, polyamino acid, polyanhydride, polyorthoesters, and their derivatives and copolymer.

5. The supercapacitor of claim 1, wherein the biodegradable solid electrolyte layer comprises one or more selected from group consisting of agarose, polyvinyl alcohol, and polyethylene oxide.

6. The supercapacitor of claim 1, further comprising a biodegradable encapsulant covering the flexible substrate, the metal electrode layer, and the biodegradable solid electrolyte layer.

7. A method for manufacturing a supercapacitor comprising:
    forming a metal electrode layer;
    disposing the metal electrode layer on a flexible substrate comprising a biodegradable polymer;
    disposing a biodegradable solid electrolyte layer on the metal electrode layer to form a structure; and
    forming a metal oxide layer between the metal electrode layer and the biodegradable solid electrolyte layer by applying electricity to the structure.

8. The method for manufacturing the supercapacitor of claim 7,
    wherein disposing the biodegradable solid electrolyte layer further comprises:
    forming a mixture by mixing sodium chloride with one or more selected from the group consisting of agarose, polyvinyl alcohol and polyethylene oxide, and
    stacking the mixture on the metal electrode layer.

* * * * *